(12) United States Patent
Wang et al.

(10) Patent No.: US 11,197,157 B2
(45) Date of Patent: Dec. 7, 2021

(54) METHOD, APPARATUS, AND SYSTEM FOR PERFORMING AUTHENTICATION ON TERMINAL IN WIRELESS LOCAL AREA NETWORK

(71) Applicant: Huawei Technologies Co., Ltd., Shenzhen (CN)

(72) Inventors: Qian Wang, Suzhou (CN); Dexiang Song, Suzhou (CN); Daoli Yu, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 16/394,161

(22) Filed: Apr. 25, 2019

(65) Prior Publication Data

US 2019/0335331 A1 Oct. 31, 2019

(30) Foreign Application Priority Data

Apr. 25, 2018 (CN) .......................... 201810377052.9

(51) Int. Cl.
*H04W 12/06* (2021.01)
*H04L 29/06* (2006.01)

(52) U.S. Cl.
CPC ......... *H04W 12/06* (2013.01); *H04L 63/0876* (2013.01)

(58) Field of Classification Search
USPC ........................................................... 726/6
See application file for complete search history.

(56) References Cited

U.S. PATENT DOCUMENTS

| | | | |
|---|---|---|---|
| 8,781,441 B1 | 7/2014 | Belser et al. | |
| 2004/0208151 A1* | 10/2004 | Haverinen | H04L 29/12009 370/338 |
| 2005/0111419 A1* | 5/2005 | Kwon | H04L 1/0002 370/338 |
| 2008/0212542 A1* | 9/2008 | Kung | H04W 36/0005 370/336 |
| 2009/0240815 A1 | 9/2009 | Han et al. | |
| 2011/0154454 A1* | 6/2011 | Frelechoux | H04L 63/166 726/5 |
| 2014/0189808 A1* | 7/2014 | Mahaffey | H04L 63/0853 726/4 |

(Continued)

FOREIGN PATENT DOCUMENTS

| | | |
|---|---|---|
| CN | 103354550 A | 10/2013 |
| CN | 106412904 A | 2/2017 |

OTHER PUBLICATIONS

"Wi-Fi Simple Configuration Technical Specification Version 2.0.5," Wifi Alliance, XP055280052, pp. 1-156 (Aug. 4, 2014).

*Primary Examiner* — Eleni A Shiferaw
*Assistant Examiner* — Sakinah White Taylor
(74) *Attorney, Agent, or Firm* — Leydig, Voit & Mayer, Ltd.

(57) ABSTRACT

A method, an apparatus, and a system for performing authentication on a terminal in a wireless local area network are provided. The method uses a feature code as a part of an authentication credential. The feature code is a function of capability parameters of a terminal. The feature code can identify the terminal, so that the authentication server determines the authentication result based on a MAC address and the feature code of the terminal.

6 Claims, 5 Drawing Sheets

(56) References Cited

U.S. PATENT DOCUMENTS

| | | | |
|---|---|---|---|
| 2015/0295915 A1* | 10/2015 | Xiu | H04L 67/26 |
| | | | 726/7 |
| 2016/0081130 A1* | 3/2016 | Wang | H04W 88/08 |
| | | | 370/254 |
| 2017/0118638 A1* | 4/2017 | Zhang | H04L 63/0876 |
| 2017/0374551 A1 | 12/2017 | Shen et al. | |
| 2018/0035292 A1* | 2/2018 | Soundararajan | H04L 67/303 |

* cited by examiner

METHOD, APPARATUS, AND SYSTEM FOR PERFORMING AUTHENTICATION ON TERMINAL IN WIRELESS LOCAL AREA NETWORK

CROSS-REFERENCE TO RELATED APPLICATIONS

This application claims priority to Chinese Patent Application No. 201810377052.9, filed on Apr. 25, 2018, which is hereby incorporated by reference in its entirety.

TECHNICAL FIELD

This application relates to the field of wireless communications technologies, and in particular, to a method, an apparatus, and a system for performing authentication on a terminal in a wireless local area network.

BACKGROUND

When accessing a wireless local area network (WLAN) for the first time, a terminal may use a user credential such as a user name and a password for authentication and network access. After authenticating the user credential, an authentication server may store a medium access control (MAC) address of the terminal. Subsequently, if the terminal disconnects from the network and re-connects to the network, or roams to another wireless access point (AP), the terminal may send an association request to the wireless AP. A sender address of the association request is the MAC address of the terminal. Then, the wireless AP may send, to the authentication server, an authentication request with the MAC address as an authentication credential. The authentication server may find, through query, that the MAC address is the MAC address of the authenticated terminal, and inform the wireless AP. Then, the terminal can access the network without entering the user name and the password again by a user.

If a malicious terminal counterfeits a MAC address of an authenticated terminal, the malicious terminal can masquerade as the authenticated terminal to access a network. Therefore, authentication for which a MAC address is used as an authentication credential has low security.

SUMMARY

To resolve the foregoing problem, this application provides a method, an apparatus, and a system for performing authentication on a terminal in a wireless network. The technical solutions are as follows:

According to a first aspect, a method for performing authentication on a terminal in a wireless local area network is provided. The method includes: receiving, by a wireless AP, an association request sent by a terminal, where the association request includes capability parameters of the terminal; sending, by the wireless AP, an authentication request to an authentication server, where the authentication request includes an authentication credential, the authentication credential includes a feature code and a sender address of the association request, the feature code is a function of the capability parameters, and the sender address of the association request is a MAC address of the terminal; and receiving, by the wireless AP, an authentication result of the terminal sent by the authentication server.

Through the foregoing processing, when authentication performed on the terminal succeeds, the terminal can access the wireless network after sending the association request to the wireless AP, and a user does not need to input a user name and a password again for authentication. This improves efficiency of wireless network access. In addition, the request sent by the wireless AP to the authentication server carries the feature code of the terminal. The feature code can identify the terminal, so that the authentication server determines the authentication result based on the MAC address and the feature code of the terminal. This prevents a malicious terminal that counterfeits a MAC address of an authenticated terminal from accessing the network, thereby improving network security.

In a possible implementation, the method further includes: storing the feature code; if the authentication result is that authentication succeeds, storing, by the wireless AP, the MAC address of the terminal in an authentication record; when the wireless AP receives a data packet sent by the terminal, if the MAC address of the terminal is not in the authentication record, forwarding, by the wireless AP, the data packet to a portal server, receiving an authentication page returned by the portal server, and forwarding the authentication page to the terminal; when receiving an authentication message sent by the terminal by using the authentication page, forwarding, by the wireless AP, the authentication message to the authentication server and sending the feature code of the terminal to the authentication server, where the authentication message carries a user credential and the MAC address of the terminal; receiving the authentication result of the terminal sent by the authentication server, and if the authentication result is that authentication succeeds, storing, by the wireless AP, the MAC address of the terminal in the authentication record.

Through the foregoing processing, when forwarding the authentication message of the terminal to the authentication server, the wireless AP may send the feature code of the terminal to the authentication server, so that the authentication server stores the MAC address and the feature code of the terminal when determining that authentication performed on the terminal succeeds.

In a possible implementation, the method further includes: arranging, by the wireless AP, the capability parameters of the terminal in a sequence, and determining the feature code based on the arranged capability parameters.

Through the foregoing processing, different terminals can be distinguished based on feature codes. This prevents a malicious terminal that counterfeits a MAC address of an authenticated terminal and masquerades as the terminal from accessing the network, thereby improving network security.

According to a second aspect, a method for performing authentication on a terminal in a wireless local area network is provided. The method includes: receiving, by an authentication server, an authentication request of the terminal sent by a wireless AP, where the authentication request includes an authentication credential, the authentication credential includes a feature code of the terminal and a MAC address of the terminal, and the feature code of the terminal is a function of capability parameters of the terminal; if the feature code of the terminal and the MAC address of the terminal are stored in the authentication server, determining, by the authentication server, that authentication performed on the terminal succeeds; or if the feature code of the terminal and the MAC address of the terminal are not stored in the authentication server, determining, by the authentication server, that authentication performed on the terminal fails; and sending, by the authentication server, an authentication result of the terminal to the wireless AP.

Through the foregoing processing, the authentication server can find, through query, whether a feature code corresponding to the MAC address of the terminal is the same as the feature code carried in the authentication request. If the feature code corresponding to the MAC address of the terminal is the same as the feature code carried in the authentication request, the authentication server may determine that authentication performed on the terminal succeeds; if the feature code corresponding to the MAC address of the terminal is different from the feature code carried in the authentication request, or the corresponding feature code is not found, the authentication server may determine that authentication performed on the terminal fails. This can prevent a malicious terminal that counterfeits a MAC address of an authenticated terminal from accessing the wireless network without being authenticated, thereby improving wireless network security.

In a possible implementation, the method further includes: receiving, by the authentication server, an authentication message of the terminal and the feature code of the terminal that are sent by the wireless AP, where the authentication message carries a user credential and the MAC address of the terminal, and if authentication performed on the user credential by the authentication server succeeds, storing the feature code of the terminal and the MAC address of the terminal.

Through the foregoing processing, when determining that authentication performed on the terminal succeeds, the authentication server may store the MAC address and the feature code of the terminal, so that when the terminal requests network access again, the authentication server can determine the authentication result of the terminal based on the stored MAC address and feature code. This improves efficiency of wireless network access, and improves wireless network security.

According to a third aspect, a wireless AP is provided. The wireless AP includes at least one module, and the at least one module is configured to implement the method for performing authentication on a terminal in a wireless local area network provided according to the first aspect.

According to a fourth aspect, an authentication server is provided. The authentication server includes at least one module, and the at least one module is configured to implement the method for performing authentication on a terminal in a wireless local area network provided according to the second aspect.

According to a fifth aspect, a system for performing authentication on a terminal in a wireless local area network is provided. The system includes a wireless AP and an authentication server.

The wireless AP is configured to receive an association request sent by a terminal, where the association request includes capability parameters of the terminal. The wireless AP sends an authentication request to the authentication server, where the authentication request includes an authentication credential, the authentication credential includes a feature code and a sender address of the association request, the feature code is a function of the capability parameters, and the sender address of the association request is a medium access control MAC address of the terminal. The wireless AP receives an authentication result of the terminal sent by the authentication server.

The authentication server is configured to receive the authentication request of the terminal sent by the wireless AP, where the authentication request includes the authentication credential, the authentication credential includes the feature code of the terminal and the MAC address of the terminal, and the feature code of the terminal is the function of the capability parameters of the terminal. If the feature code of the terminal and the MAC address of the terminal are stored in the authentication server, the authentication server determines that authentication performed on the terminal succeeds. If the feature code of the terminal and the MAC address of the terminal are not stored in the authentication server, the authentication server determines that authentication performed on the terminal fails. The authentication server sends the authentication result of the terminal to the wireless AP.

According to a sixth aspect, a wireless AP is provided. The wireless AP includes a transceiver, a memory, and a processor. The processor is configured to execute an instruction stored in the memory, and the processor executes the instruction to implement the method for performing authentication on a terminal in a wireless local area network provided according to the first aspect.

According to a seventh aspect, an authentication server is provided. The authentication server includes a transceiver, a memory, and a processor. The processor is configured to execute an instruction stored in the memory, and the processor executes the instruction to implement the method for performing authentication on a terminal in a wireless local area network provided according to the second aspect.

According to an eighth aspect, a computer readable storage medium is provided, including an instruction. When the computer readable storage medium runs on a wireless AP, the wireless AP performs the method for performing authentication on a terminal in a wireless local area network provided according to the first aspect.

According to a ninth aspect, a computer readable storage medium is provided, including an instruction. When the computer readable storage medium runs on an authentication server, the authentication server performs the method for performing authentication on a terminal in a wireless local area network provided according to the second aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may derive other drawings from these accompanying drawings without creative efforts.

DESCRIPTION OF EMBODIMENTS

Figure 1:
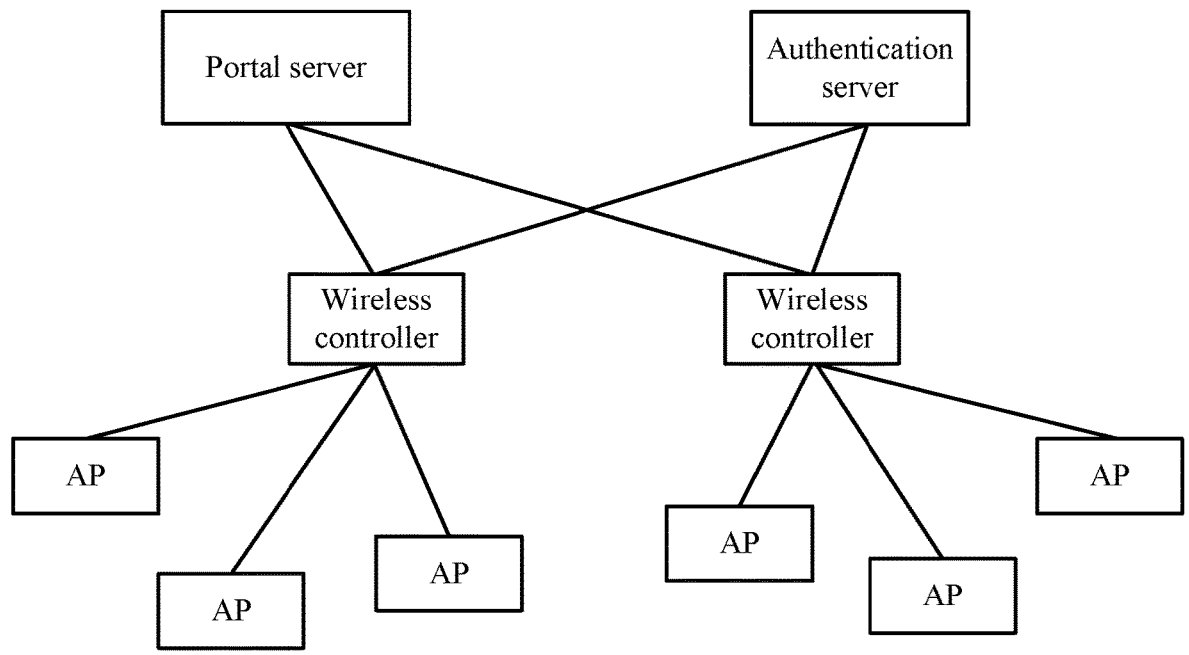
FIG. 1 is a schematic diagram of a framework of a system for performing authentication on a terminal in a wireless local area network according to an embodiment of the present invention.

The embodiments of the present invention provide a method for performing authentication on a terminal in a wireless local area network. The method may be used for a system for performing authentication on a terminal in a wireless local area network. As shown in FIG. 1, the system may include at least a wireless AP, a wireless controller, an authentication server, and a portal server. The wireless AP may be connected to the terminal wirelessly, may forward a data packet of the terminal, and may communicate with the authentication server and the portal server by using the wireless controller or directly. The wireless controller may be connected to a plurality of wireless APs and manage the plurality of wireless APs, and may communicate with the authentication server and participate in an authentication procedure of accessing the wireless network by the terminal. For example, the wireless controller may be an Access Controller (AC). The authentication server may store data of an authentication service, and may be configured to perform authentication on a user credential. The portal server may be configured to generate an authentication page. The wireless controller may be omitted. A function of the wireless controller may alternatively be implemented by a control module integrated on the wireless AP or a network switch. A function of the portal server may alternatively be implemented by a portal module integrated on the wireless controller or the authentication server.

The method may be implemented by the wireless AP and the authentication server together. After the authentication server has authenticated the user credential, the authentication server may store a MAC address of the corresponding terminal, so that a user may not input the user credential such as a user name and/or a password when the terminal accesses the wireless network again. Further, in an authentication validity period of the terminal, when the terminal sends an association request again, the authentication server may find, through query, the MAC address of the terminal, and inform the wireless AP that authentication performed on the terminal succeeds, and the terminal is allowed to access the network. In addition, to prevent another terminal that counterfeits a MAC address of an authenticated terminal from accessing the network, when receiving the association request of the terminal, the AP may calculate, by using capability parameters in the association request, a feature code corresponding to the terminal, and send the MAC address and the feature code of the terminal to the authentication server. After the authentication server has authenticated the user credential, the authentication server may correspondingly store the MAC address and the feature code of the terminal. In this way, in the foregoing process of querying for the MAC address of the terminal, the authentication server may further find, through query, whether the feature code of the terminal is the same as a feature code stored in the authentication server, that is, determine whether the terminal is the same as an authenticated terminal. This prevents an unauthenticated terminal from accessing the network through masquerading.

Figure 2:
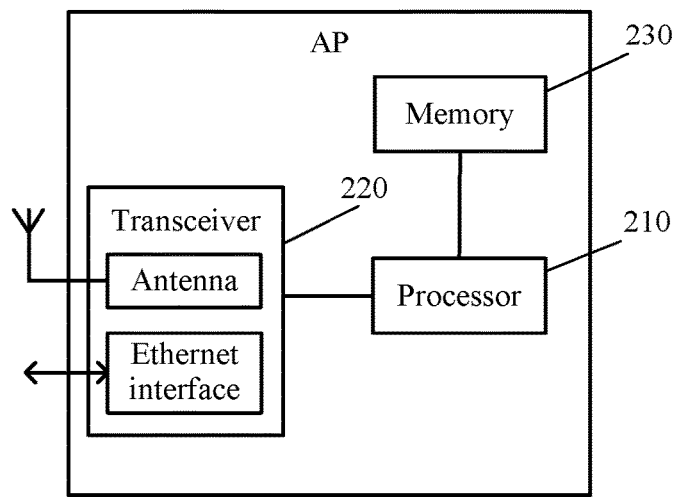
FIG. 2 is a schematic structural diagram of a wireless AP according to an embodiment of the present invention.

The wireless AP may include a processor 210 and a transceiver 220. The transceiver 220 may be connected to the processor 210, as shown in FIG. 2. The transceiver 220 may be configured to receive and send a message or data, that is, may receive the association request sent by the terminal, send an authentication request to the authentication server, receive authentication status information of the terminal sent by the authentication server, and the like. The transceiver 220 may include an antenna, and optionally, may further include an Ethernet interface. The processor 210 may be a control center of the AP, and be connected to all parts, such as the transceiver 220, of the entire AP by using various interfaces and lines. In the present invention, the processor 210 may be a central processing unit (CPU), and may be configured to perform related processing, such as calculation of the feature code of the terminal. An application processor and a modem processor may be integrated in the processor 210, where the application processor mainly processes an operating system, and the modem processor mainly processes wireless communication. The wireless AP may further include a memory 230. The memory 230 may be configured to store a software program and a module. The processor 210 reads software code and the module that are stored in the memory, to execute various function applications of the wireless AP and process data.

Figure 3:
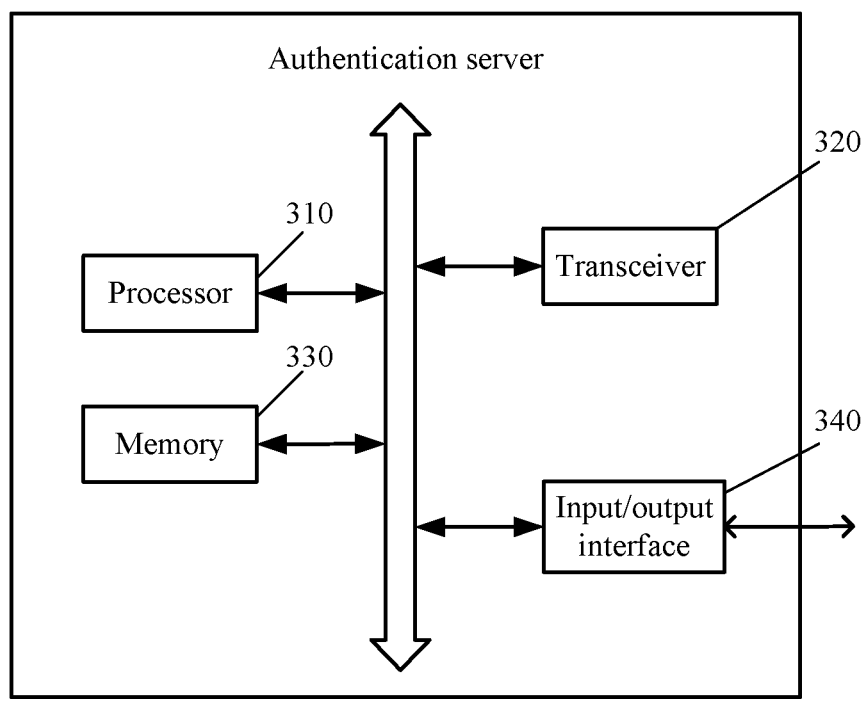
FIG. 3 is a schematic structural diagram of an authentication server according to an embodiment of the present invention.

The authentication server may include a processor 310 and a transceiver 320. The transceiver 320 may be connected to the processor 310, as shown in FIG. 3. The transceiver 320 may be configured to receive and send a message or data, that is, may receive the authentication request of the terminal sent by the wireless AP, send the authentication status information of the terminal to the wireless AP, and the like. The processor 310 may be a control center of the authentication server, and be connected to all parts, such as the transceiver 320, of the entire authentication server by using various interfaces and lines. In the present invention, the processor 310 may be a CPU, and may be configured to perform related processing, such as authentication of the user credential. The processor 310 may include one or more processing units. An application processor and a modem processor may be integrated in the processor 310, where the application processor mainly processes an operating system, and the modem processor mainly processes wireless communication. The processor 310 may alternatively be a digital signal processor, an application-specific integrated circuit, or the like. The authentication server may further include a memory 330. The memory 330 may be configured to store a software program and a module. The processor 310 reads software code and the module that are stored in the memory, to execute various function applications of the authentication server and process data. The authentication server may further include an input/output interface 340, so as to provide an interface between the processor 310 and a peripheral interface module. The peripheral interface module may be a key or the like.

Figure 4:
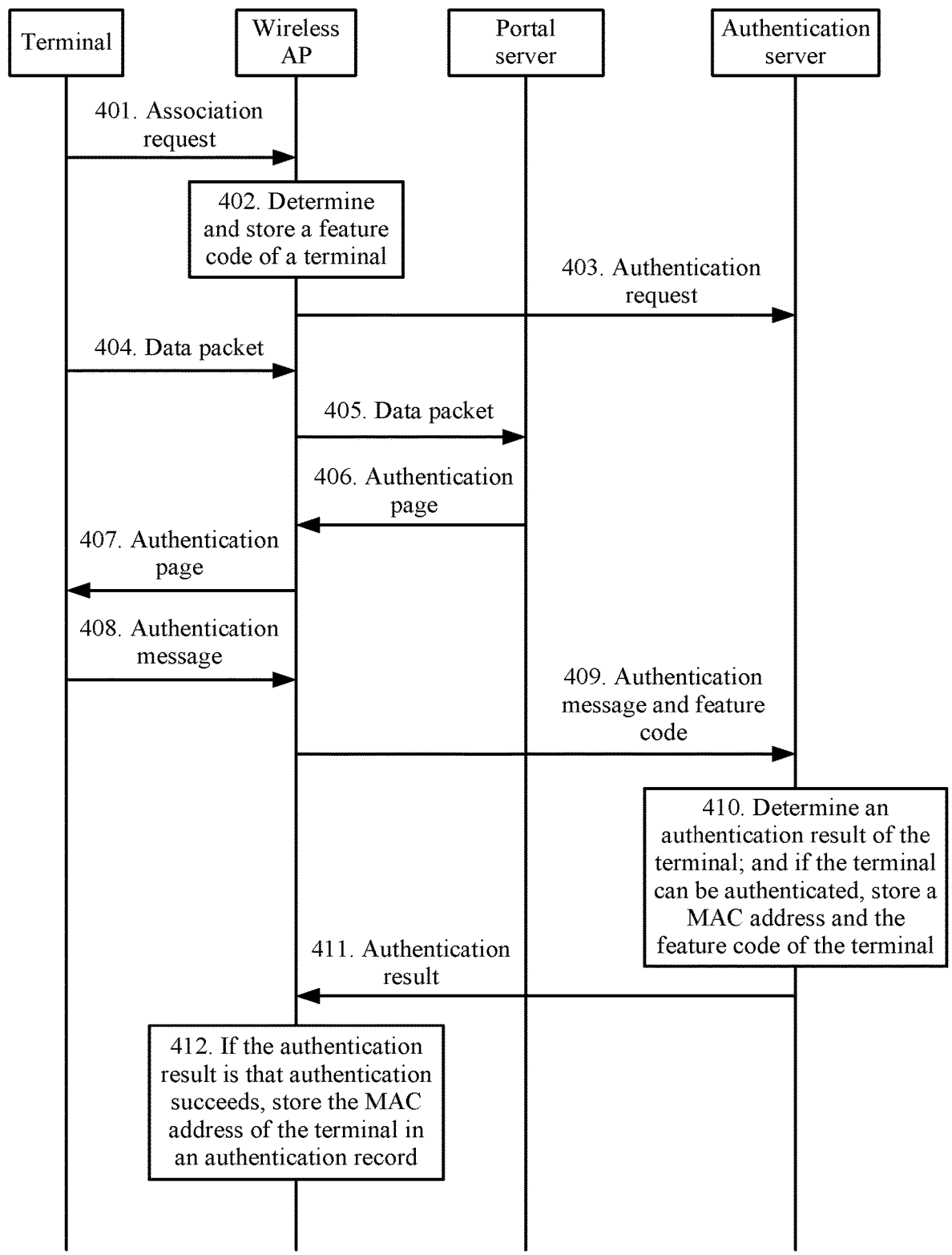
FIG. 4 is a flowchart of a method for performing authentication on a terminal in a wireless local area network according to an embodiment of the present invention.

A case in which a terminal accesses a wireless network for the first time is described first. With reference to specific implementations, a processing procedure shown in FIG. 4 is described in detail. Content may be as follows.

In step 401, a wireless AP receives an association request sent by a terminal.

The association request carries a sender address and capability parameters of the terminal. The association request may be an association request frame or a reassociation request frame.

During implementation, a wireless network provider may deploy the wireless AP of the WLAN network in some public places. The terminal needs to be authenticated on an authentication page to access the network. When accessing the wireless AP, the terminal may send the association request to the wireless AP, and then the wireless AP may receive the association request. A field of the capability parameters may include a supported rate, an extended supported rate, a power capability, a supported channel, a robust security network (RSN), a quality of service (QoS) capability, a supported operating class, an extended capability, a radio management (RM) enabled capability, a high throughput (HT) capability, 20/40 basic service set (BSS) coexistence, a quality of service traffic capability, vendor specific (English: vendor specific), and the like. The association request may include a MAC address of the terminal (in a field of the sender address), a service set identifier (SSID) of the to-be-associated wireless AP, a basic service set identifier (BSSID), and a plurality of capability parameters that represent capabilities of the terminal.

Capability parameters carried in association requests of different terminals are different, and may be some of capability parameters mentioned in a communications protocol. In addition, sequences of the capability parameters and specific parameter values of the capability parameters are also different. Terminals of different vendors or different lots have different capability parameters. However, capability parameters of a same terminal may be arranged in a preset sequence, and the sequence of the capability parameters and specific parameter values of the capability parameters are unchanged in an association request of the same terminal. For example, a terminal A supports fewer rates, namely, only four rates: 1.0 Mbps, 2.0 Mbps, 5.5 Mbps, and 11.0 Mbps; a terminal B supports more rates than the terminal A, namely, eight rates: 1.0 Mbps, 2.0 Mbps, 5.5 Mbps, 6.0 Mbps, 9.0 Mbps, 11.0 Mbps, 12.0 Mbps, and 18.0 Mbps.

When receiving the association request sent by the terminal, the wireless AP may send an association response to the terminal, so that the terminal accesses the network by using the wireless AP.

In step 402, the wireless AP determines and stores a feature code of the terminal.

When receiving the association request sent by the terminal, the wireless AP may obtain the plurality of capability parameters in the association request, and determine the feature code corresponding to the terminal. The feature code may be used to identify the terminal. The feature code is a function of the capability parameters. For example, the feature code may be the capability parameters, may be the capability parameters arranged in a specified sequence, may be a value that is obtained through operation based on the capability parameters and a specified algorithm, or may be a value that is obtained through operation based on the capability parameters arranged in a specified sequence and a specified algorithm. For terminals that have different capability parameters, usually, feature codes obtained through calculation are also different. For example, the algorithm may be a hash algorithm. After determining the feature code of the terminal, the wireless AP may store the feature code of the terminal.

Before determining the feature code of the terminal, the wireless AP may arrange the capability parameters in the preset sequence and based on a location of each capability parameter in the association request. Then, the wireless AP may calculate the feature code for the arranged capability parameters. Similar to or the same as the foregoing process, the feature code may be the arranged capability parameters, or may be the value that is obtained through operation based on the capability parameters arranged in the specified sequence and the specified algorithm. Feature codes of all terminals obtained by the wireless AP based on the foregoing processing are usually different, so that different terminals can be distinguished. This prevents a malicious terminal that counterfeits a MAC address of an authenticated terminal and masquerades as the terminal from accessing the network. Further, for a case in which the capability parameters are arranged in the preset sequence when the terminal sends the capability parameters, the wireless AP directly generates the corresponding feature code without changing the sequence of the capability parameters in the association request. This increases difficulty of masquerading as the terminal, thereby improving network security.

In step 403, the wireless AP sends an authentication request to an authentication server.

The authentication request includes an authentication credential, where the authentication credential includes the sender address and the feature code in the association request. The feature code includes the function of the capability parameters, and the sender address in the association request may be the MAC address of the terminal. The wireless AP may communicate with the authentication server based on an Authentication, Authorization and Accounting (AAA) protocol. For example, the AAA protocol may be a Remote Authentication Dial In User Service (RADIUS) protocol or a Diameter protocol (an updated version of the RADIUS protocol). For the RADIUS protocol, the authentication request sent by the wireless AP to the authentication server may be a RADIUS access request packet, an authentication result that indicates that authentication succeeds and that is sent by the authentication server to the wireless AP may be in a RADIUS access accept packet, and an authentication result that indicates that authentication fails and that is sent to the wireless AP may be in a RADIUS access reject packet.

An authentication record may be established in the wireless AP in advance. At least a MAC address of an authenticated terminal is recorded in the authentication record, indicating that the corresponding terminal can access the network, and the wireless AP is to normally forward a data packet of the terminal. Because the terminal accesses the wireless network for the first time, a control module of the wireless AP may receive the authentication result of the terminal that indicates that authentication fails and that is fed back by the authentication server, and in this case, the wireless AP may not store the MAC address of the terminal in the authentication record. If the MAC address is stored in the authentication record, the wireless AP may delete the MAC address.

In step 404, the wireless AP receives a data packet of the terminal.

In step 405, if the MAC address of the terminal is not in the authentication record, the wireless AP forwards the data packet to a portal server.

When the terminal sends the to-be-forwarded data packet to the wireless AP, if the wireless AP does not find the MAC address of the terminal in the authentication record, the wireless AP may forward the data packet to the portal server, so that the portal server generates an authentication page.

In step 406, the portal server sends an authentication page to the wireless AP.

In step 407, the wireless AP receives the authentication page returned by the portal server, and forwards the authentication page to the terminal.

When receiving the data packet forwarded by the wireless AP, the portal server may generate the authentication page based on the data packet. The authentication page may be in a mapping relationship with the data packet, so that when authentication performed on the user credential succeeds, the wireless AP may continue to process the data packet. Then the portal server may send the authentication page to the wireless AP.

The wireless AP may forward the authentication page to the terminal, so that the terminal displays the authentication page. An input field of an account and/or a password may be set on the authentication page. After a user inputs a user name and a password, the user may click a button for confirming connection, to trigger an authentication instruction. Then, the terminal may send, to the wireless AP by using the authentication page, an authentication message carrying a user credential and the MAC address.

In step 408, the wireless AP receives an authentication message sent by the terminal by using the authentication page.

In step 409, the wireless AP forwards the authentication message to the authentication server and sends the feature code of the terminal to the authentication server.

The authentication message carries the user credential and the MAC address of the terminal.

During implementation, the wireless AP has no capability of performing authentication on the user credential, and needs to forward the user credential to the authentication server. In addition, the feature code of the terminal may be stored in the wireless AP, and the wireless AP may obtain the feature code and send the feature code of the terminal and the MAC address of the terminal together to the authentication server, so that the authentication server obtains the feature code of the terminal based on the MAC address of the terminal.

In step 410, the authentication server receives the authentication message of the terminal and the feature code of the terminal that are sent by the wireless AP, and performs authentication on the user credential.

An authenticated-terminal information list may be established in the authentication server in advance, and the information list includes information such as a MAC address, a feature code, and online duration of a terminal. After receiving the authentication message of the terminal forwarded by the wireless AP, the authentication server may perform authentication on the user credential in the authentication message.

If authentication performed on the user credential succeeds, it is determined that the authentication result of the terminal is that authentication succeeds. Then the authentication server may correspondingly store the MAC address and the feature code of the terminal in the authenticated-terminal information list. Subsequently, if the terminal is out of an authentication validity period, the authentication server may delete corresponding information of the terminal from the information list, so that the user inputs the user credential such as the user name and the password again for re-authentication.

If authentication performed on the user credential fails, it is determined that the authentication result of the terminal is that authentication fails.

In step 411, the authentication server sends the authentication result of the terminal to the wireless AP.

The authentication server may send the authentication result of the terminal to the wireless AP, or may send the authentication result of the terminal to the wireless AP by using a wireless controller.

In step 412, when the wireless AP receives the authentication result of the terminal sent by the authentication server, if the authentication result is that authentication succeeds, the wireless AP stores the MAC address of the terminal in the authentication record.

When the wireless AP determines that the authentication result of the terminal is that authentication succeeds, the wireless AP may store the MAC address of the terminal in the authentication record, and this indicates that the terminal can access the network. In a subsequent process, when receiving the data packet of the terminal, the wireless AP may normally forward the data packet of the terminal.

Figure 5:
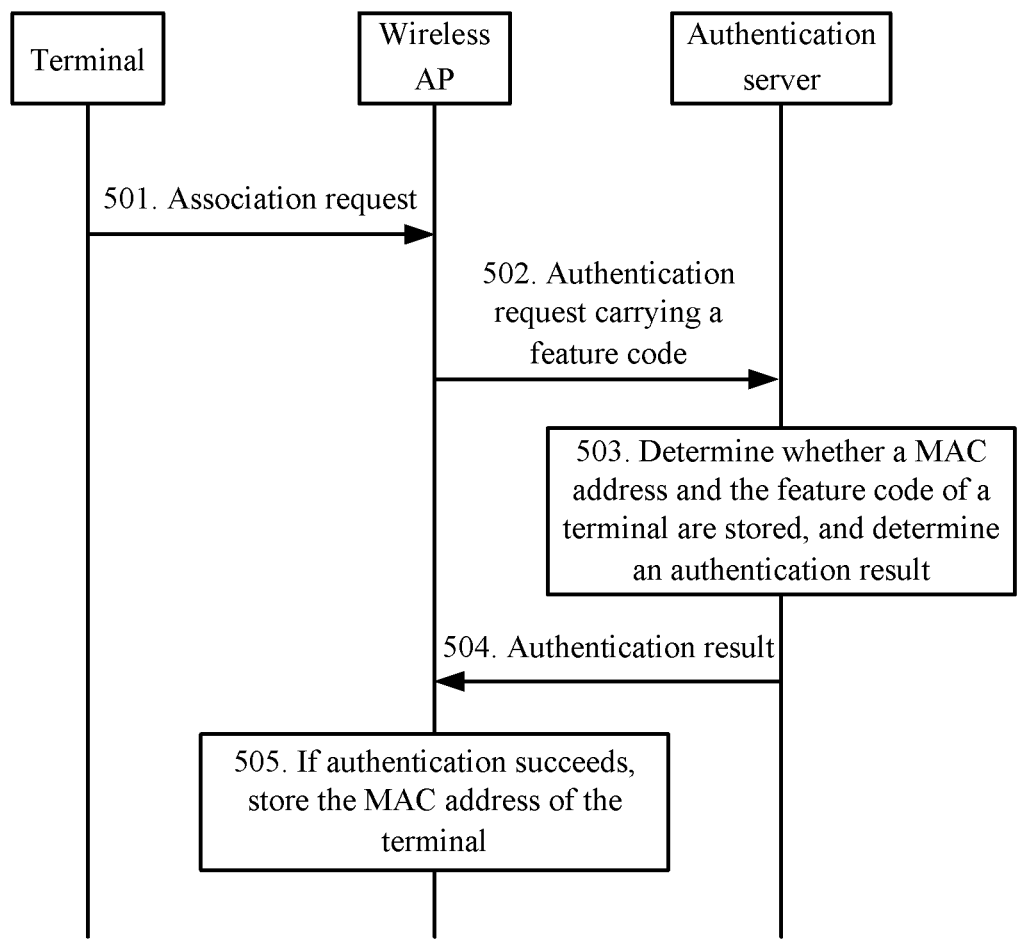
FIG. 5 is a flowchart of a method for performing authentication on a terminal in a wireless local area network according to an embodiment of the present invention.

The following describes cases in which a terminal accesses a wireless network again. There may be two cases. In a first case, the terminal disconnects from the network, and then accesses the network again; in a second case, the terminal roams to another AP. With reference to specific implementations, a processing procedure shown in FIG. 5 is described in detail. Content may be as follows.

In step 501, a wireless AP receives an association request sent by a terminal.

The association request carries a sender address and capability parameters of the terminal, and the sender address in the association request may be a MAC address of the terminal.

During implementation, when the terminal disconnects from the network and then accesses the network again, or the terminal roams to another AP, the terminal needs to send the association request again to the AP.

In step 502, the wireless AP sends an authentication request to an authentication server.

The authentication request includes an authentication credential, where the authentication credential includes the sender address in the authentication request and a feature code, and the feature code includes a function of the capability parameters.

A process in step 501 and step 502 is similar to a process in the foregoing descriptions about accessing the wireless network by the terminal for the first time, and details are not described herein again.

Then, the authentication server may receive the authentication request of the terminal sent by the wireless AP.

In step 503, the authentication server determines an authentication result of the terminal.

The authentication result of the terminal may be that authentication succeeds or authentication fails. Corresponding determining processing may be as follows: If the MAC address of the terminal and the feature code of the terminal are stored in the authentication server, it is determined that authentication performed on the terminal succeeds; if the MAC address of the terminal and the feature code of the terminal are not stored in the authentication server, it is determined that authentication performed on the terminal fails.

If the terminal is not in an authentication validity period, corresponding information of the terminal has been deleted from an authenticated-terminal information list in the authentication server when the terminal is out of the authentication validity period. Therefore, when determining the authentication result of the terminal, the authentication server cannot find the MAC address and the feature code of the terminal in the information list, and may determine that authentication performed on the terminal fails.

If the terminal is in an authentication validity period, the authentication server may find, by querying the foregoing authentication-terminal information list, whether a feature code corresponding to the MAC address of the terminal is the same as the feature code carried in the authentication request. If the feature code corresponding to the MAC address of the terminal is the same as the feature code carried in the authentication request, the authentication server may determine that authentication performed on the terminal succeeds; if the feature code corresponding to the MAC address of the terminal is different from the feature code carried in the authentication request, or the corresponding feature code is not found, the authentication server may determine that authentication performed on the terminal fails. Based on the foregoing processing, if authentication fails because the feature codes are different, it indicates that the MAC address may be counterfeited.

In step 504, the authentication server sends the authentication result of the terminal to the wireless AP.

After determining the authentication result of the terminal in the foregoing process, the authentication server may send the authentication result to the wireless AP, or send the authentication result to the wireless AP by using a wireless controller.

In step 505, when the wireless AP receives the authentication result of the terminal sent by the authentication server, if the authentication result is that authentication succeeds, the wireless AP stores the MAC address of the terminal in an authentication record.

During implementation, when receiving the authentication result of the terminal, the wireless AP may determine whether the authentication result is that authentication succeeds. If the authentication result is that authentication succeeds, the wireless AP may store the MAC address of the terminal in the authentication record; if the authentication result is that authentication fails, the wireless AP may not store the MAC address of the terminal in the authentication record.

Optionally, when the terminal sends, to the wireless AP, a data packet that needs to be forwarded, the AP may receive the data packet of the terminal, and determine whether the MAC address of the terminal is stored in an authentication record table. If the MAC address of the terminal is stored in the authentication record, the wireless AP may forward the data packet; if the MAC address of the terminal is not in the authentication record, the wireless AP may forward the data packet to a portal server, and when receiving an authentication page returned by the portal server, forward the authentication page to the terminal.

During implementation, if the MAC address of the terminal is stored in the authentication record, it indicates that the terminal can access the network, and the wireless AP can normally forward the data packet of the terminal. If the MAC address of the terminal is not stored, it indicates that the terminal cannot access the network. A subsequent processing process is similar to a process in the foregoing descriptions about accessing the wireless network by the terminal for the first time, and details are not described herein again.

In the foregoing disclosed embodiments, the wireless AP may determine the feature code based on the capability parameters of the terminal. The feature code is corresponding to the terminal. When finding that the MAC address and the feature code of the terminal are correspondingly stored, the authentication server may determine that authentication performed on the terminal succeeds, and may inform the wireless AP that the terminal can access the network. When the terminal requests wireless network access again, the terminal can access the network without inputting the user credential such as the user name and/or the password again by the user. This improves efficiency of wireless network access. In addition, the authentication server correspondingly stores the MAC address and the feature code of the terminal, so as to prevent a malicious terminal that counterfeits a MAC address of an authenticated terminal from accessing the wireless network without being authenticated, thereby improving security of wireless network access.

Figure 6:
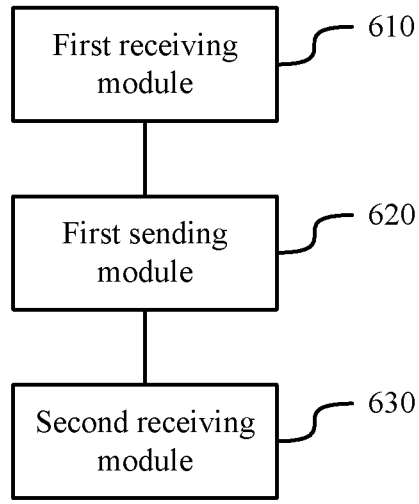
FIG. 6 is a schematic structural diagram of a wireless network access authentication apparatus according to an embodiment of the present invention.

Based on the same technical idea, an embodiment of the present invention further provides an apparatus for performing authentication on a terminal in a wireless local area network, and the apparatus may be the foregoing wireless AP. As shown in FIG. 6, the apparatus includes:

a first receiving module 610, configured to receive, for the wireless access point AP, an association request sent by a terminal, where the association request includes capability parameters of the terminal, and the first receiving module 610 may specifically implement a receiving function in the foregoing steps 401 and 501 and another implicit step;

a first sending module 620, configured to send, for the wireless AP, an authentication request to an authentication server, where the authentication request includes an authentication credential, the authentication credential includes a feature code and a sender address of the association request, the feature code is a function of the capability parameters, and the sender address of the association request is a medium access control MAC address of the terminal; and the first sending module 620 may specifically implement a sending function in the foregoing steps 402 and 502 and another implicit step; and a second receiving module 630, configured to receive, for the wireless AP, an authentication result of the terminal sent by the authentication server, where the second receiving module 630 may specifically implement a receiving function in the foregoing steps 408 and 505 and another implicit step.

Optionally, the wireless AP further includes a storage module 640, configured to store the feature code; if the authentication result is that authentication succeeds, the wireless AP stores the MAC address of the terminal in an authentication record;

a second sending module 650, configured to: when the wireless AP receives a data packet sent by the terminal, if the MAC address of the terminal is not in the authentication record, forward, for the wireless AP, the data packet to a portal server, receive an authentication page returned by the portal server, and forward the authentication page to the terminal;

a third sending module 660, configured to: when receiving an authentication message sent by the terminal by using the authentication page, forward, for the wireless AP, the authentication message to the authentication server, and send the feature code of the terminal to the authentication server, where the authentication message carries a user credential and the MAC address of the terminal; and a third receiving module 670, configured to: receive the authentication result of the terminal sent by the authentication server, and if the authentication result is that authentication succeeds, store, for the wireless AP, the MAC address of the terminal in the authentication record.

Optionally, the wireless AP further includes:

a determining module 680, configured to arrange, for the wireless AP, the capability parameters of the terminal in a sequence, and determine the feature code based on the arranged capability parameters.

It should be noted that the first receiving module 610 may be implemented by a transceiver, the first sending module 620 may be implemented by the transceiver, the second receiving module 630 may be implemented by the transceiver, the storage module 640 may be implemented by a memory, the second sending module 650 may be implemented by the transceiver and the memory together, the third sending module 660 may be implemented by the transceiver, the third receiving module 670 may be implemented by the transceiver and the memory together, and the determining module 680 may be implemented by a processor.

Figure 7:
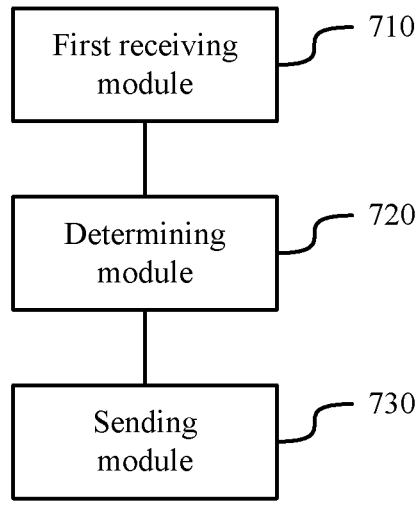
FIG. 7 is a schematic structural diagram of a wireless network access authentication apparatus according to an embodiment of the present invention.

Based on the same technical idea, an embodiment of the present invention further provides an apparatus for performing authentication on a terminal in a wireless local area network, and the apparatus may be the foregoing authentication server. As shown in FIG. 7, the apparatus includes:

a first receiving module 710, configured to receive, for the authentication server, an authentication request of the terminal sent by a wireless access point AP, where the authentication request includes an authentication credential, the authentication credential includes a feature code of the terminal and a medium access control MAC address of the terminal, and the feature code of the terminal is a function of capability parameters of the terminal; and the first receiving module 710 may specifically implement a receiving function in the foregoing steps 406 and 503 and another implicit step;

a determining module 720, configured to: if the feature code of the terminal and the MAC address of the terminal are stored in the authentication server, determine, for the authentication server, that authentication performed on the terminal succeeds; or if the feature code of the terminal and the MAC address of the terminal are not stored in the authentication server, determine, for the authentication server, that authentication performed on the terminal fails, where the determining module 720 may specifically implement a determining function in the foregoing steps 404 and 504 and another implicit step; and a sending module 730, configured to send, for the authentication server, an authentication result of the terminal to the wireless AP, where the sending module 730 may specifically implement a sending function in the foregoing steps 407 and 505 and another implicit step.

Optionally, the authentication server further includes:

a second receiving module 740, configured to receive, for the authentication server, an authentication message of the terminal and the feature code of the terminal that are sent by the wireless AP, where the authentication message carries a user credential and the MAC address of the terminal; and a storage module 750, configured to: if authentication performed on the user credential by the authentication server succeeds, store the feature code of the terminal and the MAC address of the terminal.

It should be noted that the first receiving module 710 may be implemented by a transceiver, the determining module 720 may be implemented by a memory and a processor together, the sending module 730 may be implemented by the transceiver, the second receiving module 740 may be implemented by the transceiver, and the storage module 750 may be implemented by the memory.

In the foregoing disclosed embodiments, the wireless AP may determine the feature code based on the capability parameters of the terminal. The feature code is corresponding to the terminal. When finding that the MAC address and the feature code of the terminal are correspondingly stored, the authentication server may determine that authentication performed on the terminal succeeds, and may inform the wireless AP that the terminal can access the network. When the terminal requests wireless network access again, the terminal can access the network without inputting the user credential such as the user name and/or the password again by the user. This improves efficiency of wireless network access. In addition, the authentication server correspondingly stores the MAC address and the feature code of the terminal, so as to prevent a malicious terminal that counterfeits a MAC address of an authenticated terminal from accessing the wireless network without being authenticated, thereby improving security of wireless network access.

It should be noted that, when the apparatus for performing authentication on a terminal in a wireless local area network provided in the foregoing embodiments performs authentication on the terminal in the wireless local area network, division of the foregoing functional modules is merely used as an example for description. In actual application, the foregoing functions may be allocated to and implemented by different functional modules depending on a requirement, that is, internal structures of the wireless AP and the authentication server are divided into different functional modules to implement all or some of the foregoing functions described above. In addition, the apparatus for performing authentication on a terminal in a wireless local area network and the method for performing authentication on a terminal in a wireless local area network that are provided in the foregoing embodiments belong to a same idea. For specific implementation processes thereof, refer to the method embodiments, and details are not described herein again.

All or some of the foregoing embodiments may be implemented by using software, hardware, or a combination thereof. When the software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer instructions may be stored in a computer readable storage medium or may be transmitted from a computer readable storage medium to another computer readable storage medium. For example, the computer instructions may be transmitted from a web site, computer, server, or data center to another web site, computer, server, or data center in a wired (for example, a coaxial cable, an optical fiber, or a twisted pair) or wireless (for example, infrared, radio, or microwave) manner. The computer readable storage medium may be any medium that can be accessed by a computer, or a data storage device such as a server or a data center that include one or more media. The medium may be a magnetic medium (for example, a floppy disk, a hard disk, or a magnetic tape), or may be an optical medium (for example, an optical disk) or a semiconductor medium (for example, a solid state disk).

What is claimed is:

1. A method for performing authentication on a terminal in a wireless local area network, wherein the method comprises:

receiving, by a wireless access point (AP), an association request sent by a terminal, wherein the association request comprises capability parameters of the terminal, each of the capability parameters is carried by a field of the association request, and wherein the capability parameters of the terminal do not include a service set identifier (SSID) of the terminal;

arranging, by the wireless AP, the capability parameters of the terminal in a sequence and the sequence is based on a location order of the fields of the capability parameters in the association request;

determining, by the wireless AP, the feature code based on the arranged capability parameters;

sending, by the wireless AP, an authentication request to an authentication server, wherein the authentication request comprises an authentication credential, the authentication credential comprises a feature code and a sender address of the association request, the feature code is a function of the capability parameters, and the sender address of the association request is a medium access control (MAC) address of the terminal; and receiving, by the wireless AP, an authentication result of the terminal sent by the authentication server.

2. The method according to claim 1, wherein after the receiving, by the wireless AP, an association request sent by a terminal, the method further comprises:
storing the feature code;
after the receiving, by the wireless AP, the authentication result of the terminal sent by the authentication server, the method further comprises:
when the authentication result is that authentication succeeds, storing, by the wireless AP, the MAC address of the terminal in an authentication record; and
the method further comprises:
when the wireless AP receives a data packet sent by the terminal, when the MAC address of the terminal is not in the authentication record, forwarding, by the wireless AP, the data packet to a portal server, receiving an authentication page returned by the portal server, and forwarding the authentication page to the terminal;
when receiving an authentication message sent by the terminal using the authentication page, forwarding, by the wireless AP, the authentication message to the authentication server and sending the feature code of the terminal to the authentication server, wherein the authentication message carries a user credential and the MAC address of the terminal; and
receiving the authentication result of the terminal sent by the authentication server, and when the authentication result is that authentication succeeds, storing, by the wireless AP, the MAC address of the terminal in the authentication record.

3. A method for performing authentication on a terminal in a wireless local area network, wherein the method comprises:
receiving, by an authentication server, an authentication request of the terminal sent by a wireless access point (AP), wherein the authentication request comprises an authentication credential, the authentication credential comprises a feature code of the terminal and a medium access control (MAC) address of the terminal, and the feature code of the terminal is a function of capability parameters of the terminal and each of the capability parameters is carried by a field of an association request, and wherein the capability parameters of the terminal do not include a service set identifier (SSID) of the terminal, and wherein the wireless AP arranges the capability parameters of the terminal in a sequence and the sequence is based on a location order of the fields of the capability parameters in the association request and determines the feature code based on the arranged capability parameters;
when the feature code of the terminal and the MAC address of the terminal are stored in the authentication server, determining, by the authentication server, that authentication performed on the terminal succeeds; or
when the feature code of the terminal and the MAC address of the terminal are not stored in the authentication server, determining, by the authentication server, that authentication performed on the terminal fails; and
sending, by the authentication server, an authentication result of the terminal to the wireless AP.

4. The method according to claim 3, wherein the method further comprises:
receiving, by the authentication server, an authentication message of the terminal and the feature code of the terminal that are sent by the wireless AP, wherein the authentication message carries a user credential and the MAC address of the terminal; and
when authentication performed on the user credential by the authentication server succeeds, storing the feature code of the terminal and the MAC address of the terminal.

5. A wireless access point (AP), wherein the wireless AP comprises a transceiver, a memory, and a processor, wherein
the transceiver, the memory, and the processor are configured to perform a method comprising:
receiving an association request sent by a terminal, wherein the association request comprises capability parameters of the terminal, each of the capability parameters is carried by a field of the association request, and wherein the capability parameters of the terminal do not include a service set identifier (SSID) of the terminal;
arrange the capability parameters of the terminal in a sequence and the sequence is based on a location order of the fields of the capability parameters in the association request;
determine the feature code based on the arranged capability parameters;
sending an authentication request to an authentication server, wherein the authentication request comprises an authentication credential, the authentication credential comprises a feature code and a sender address of the association request, the feature code is a function of the capability parameters, and the sender address of the association request is a medium access control (MAC) address of the terminal; and
receiving an authentication result of the terminal sent by the authentication server.

6. An authentication server, wherein the authentication server comprises a transceiver, a memory, and a processor, wherein
the transceiver, the memory, and the processor are configured to perform a method comprising:
receiving an authentication request of the terminal sent by a wireless access point (AP), wherein the authentication request comprises an authentication credential, the authentication credential comprises a feature code of the terminal and a medium access control (MAC) address of the terminal, and the feature code of the terminal is a function of capability parameters of the terminal and each of the capability parameters is carried by a field of an association request, and wherein the capability parameters of the terminal do not include a service set identifier (SSID) of the terminal, and wherein the wireless AP arranges the capability parameters of the terminal in a sequence and the sequence is based on a location order of the fields of the capability parameters in the association request and determines the feature code based on the arranged capability parameters;
when the feature code of the terminal and the MAC address of the terminal are stored in the authentication server, determining that authentication performed on the terminal succeeds; or
when the feature code of the terminal and the MAC address of the terminal are not stored in the authentication server, determining that authentication performed on the terminal fails; and
sending an authentication result of the terminal to the wireless AP.

* * * * *